United States Patent [19]

Rädisch

[11] 4,218,500
[45] Aug. 19, 1980

[54] SAFETY GLAZING CONTAINING SUPPORT FOR ATTACHMENT OF LABELS

[75] Inventor: Helmer Rädisch, Aachen, Fed. Rep. of Germany

[73] Assignee: Saint-Gobain Industries, Neuilly-sur-Seine, France

[21] Appl. No.: 952,234

[22] Filed: Oct. 18, 1978

Related U.S. Application Data

[63] Continuation-in-part of Ser. No. 765,110, Feb. 2, 1977, abandoned.

[30] Foreign Application Priority Data

Feb. 12, 1976 [FR] France .............................. 76 03814

[51] Int. Cl.² .......................................... B32B 3/14
[52] U.S. Cl. .................................... 428/78; 156/285; 156/299; 428/210; 428/417; 428/430; 428/423.3; 428/431; 428/435; 428/424.4; 428/436; 428/437; 428/424.6; 428/439; 428/441; 428/442

[58] Field of Search .................. 428/35, 78, 210, 417, 428/425, 430, 431, 435, 436, 437, 439, 441, 442; 156/285, 299

[56] References Cited

U.S. PATENT DOCUMENTS 3,900,673  8/1975  Mattimore ........................... 428/339
3,979,548  9/1976  Schäfer ............................... 428/425

Primary Examiner—Marion McCamish
Attorney, Agent, or Firm—John T. Synnestvedt; Ernest G. Szoke

[57] ABSTRACT

The invention relates to safety glass comprising a silicate glass layer and a coating of an elastic material forming a protective layer on at least one side of said glass layer. The coated side has a delineated area formed of a relatively hard, scratch-resistant material to which a label may be removably attached. Thus, when the label is removed, the protective layer is not damaged.

15 Claims, 2 Drawing Figures

SAFETY GLAZING CONTAINING SUPPORT FOR ATTACHMENT OF LABELS

RELATED APPLICATIONS

This application is a continuation-in-part of application Ser. No. 765,110, filed Feb. 2, 1977, now abandoned, the disclosure of which is incorporated herein by reference.

BACKGROUND OF THE INVENTION

1. Field of the Invention

The invention relates to improvements in safety glazing construction particularly, laminated safety glass windshields having a soft plastic inside layer.

2. Description of Prior Art

In general, safety glass consists of a single sheet of tempered glass with an elastic material which forms a protective layer. The elastic coating prevents lacerations from occupant impact to the windshield during a collision. Due to its elasticity, the protective layer also absorbs small scratches and other surface deformations which may result, for instance, from cleaning the windshield. Safety glass is especially useful as vehicle windshields as shown in French Pat. Nos. 1,425,292 and 2,134,255 and German Patent No. 1,696,051.

It has become a common practice to affix various labels to vehicle windshields, particularly to the inner surface of the windshield. For example, in certain European countries, a tax label must be glued to the inner surface of all windshields. This label indicates payment of a required vehicle tax. In this country, many state laws require safety inspection stickers to be affixed to the inner surface of vehicle windshields. These labels must be securely affixed to the windshields, yet they must be removed and replaced periodically, e.g. yearly. To remove the label, it is often necessary to scrape it from the window using a sharp instrument such as a knife or razor blade. When the windshield is constructed of safety glass coated with a protective layer, scraping the protective material to remove the label may damage said protective layer, particularly if this layer consists of a relatively soft plastic. The present invention discloses plastic coated safety glass having a delineated area of its surface comprising a hard, scratch-resistant material to which a label may be affixed. Thus, any damage to the protective plastic layer occasioned by scraping off the label is eliminated.

SUMMARY OF THE INVENTION

The invention relates to laminated safety windows comprising a transparent substrate coated with an elastic material preferably a self-healing soft plastic film which forms a protective layer. The safety window has at least one area of its coated surface of approximately label size comprising a hard, scratch-resistant material to which labels may be affixed. In this manner, when the label is removed, even if a knife or razor blade is used, the protective layer is not damaged.

In the preferred embodiment, the entire glass substrate is coated with the elastic protective material. A label support consisting of a hard, scratch-resistant material is secured to the protective layer. Labels are attached to the label support. When a label is removed from the surface of the hard, scratch-resistant material, the protective layer is not disturbed. To facilitate attachment of the label to the hard, scratch-resistant label support material, it is advantageous to color the area of the label support. This is accomplished by employing a colored support material or by using a colored adhesive for securing transparent label support material to the protective material.

BRIEF DESCRIPTION OF THE DRAWINGS

The preferred embodiment of the invention is described hereinbelow with reference to the drawings wherein.

DETAILED DESCRIPTION OF THE DRAWINGS AND EMBODIMENTS

Figure 1:
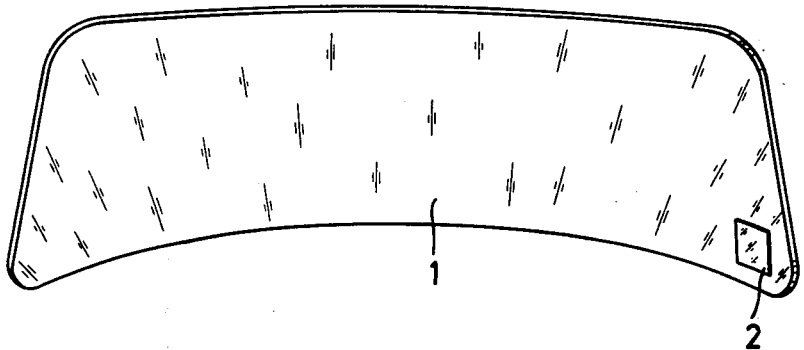
FIG. 1 is an elevational view of a vehicular windshield with a label support attached to the protective layer.
Figure 2:
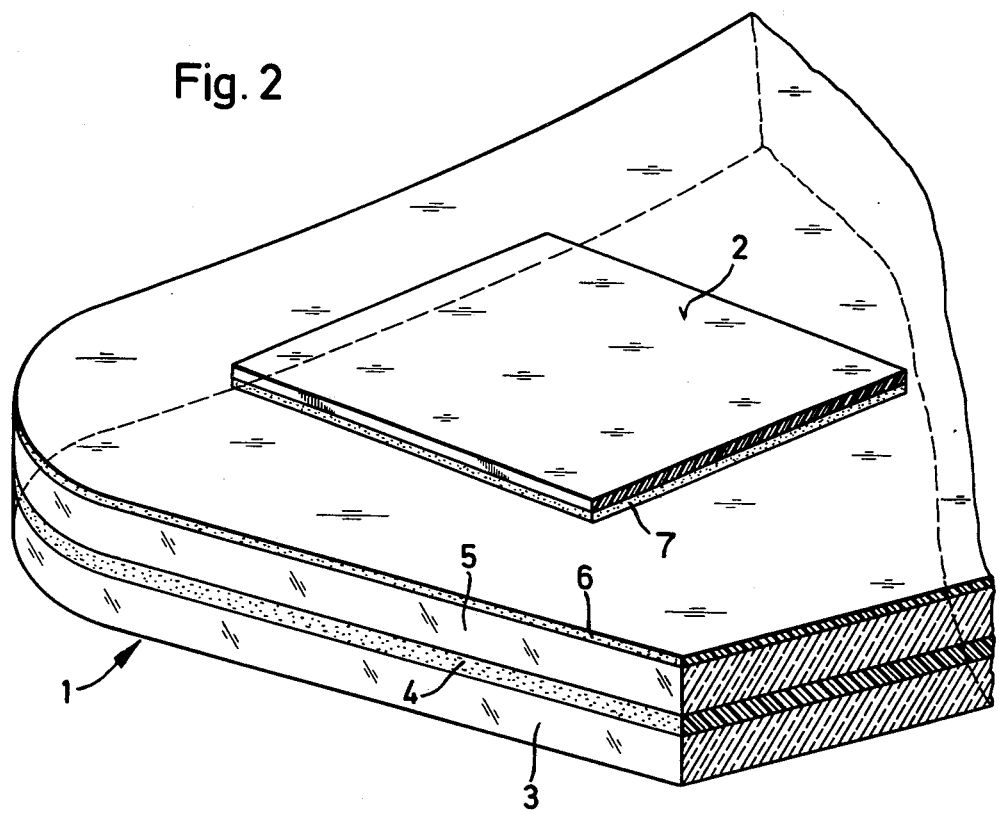
FIG. 2 is an enlarged perspective view of FIG. 1, partially in cross-section.

Referring to FIG. 1, a windshield 1 is shown having an area of a hard-resistant material which comprises label support 2 affixed to the lower right hand corner of the inner surface of windshield 1. The surface area of the label support generally comprises about 0.1 to about 1.0% of the total inner surface of the windshield though, if preferred, it can be larger or smaller. In the preferred embodiments, the label support surface is generally of rectangular configuration about 5 to 20 cm on a side or about 25 to 100 $cm^2$ and generally located in the lower right hand corner of the windshield as shown in FIG. 1. As shown in FIG. 2, windshield 1 is a typical safety glass consisting of a first sheet of silicate glass 3, an intermediate layer 4 of a thermoplastic material such as polyvinylbutyral, a second sheet of silicate glass 5, and a protective elastomeric layer 6 preferably a film of autoadhesive self-healing polyurethane. Support 2, generally comprising a hard plastic sheet of approximately label size and dimensions is affixed to the protective layer 6 using a layer of adhesive 7.

In its preferred embodiments, the safety windows of this invention are laminated safety glass comprising a simple or composite sheet of glass and a sheet of plastic material adhered to an outer face of the glass sheet, which is intended to be inside the vehicle or other structure when installed. Such laminated safety glass is made according to known processes in which a sheet of glass or glass composite and the sheet of plastic material to be joined are superimposed, optionally, with an adhesive coating or layer between them. For processing purposes only there is then placed on the free face of the plastic sheet a protective or guard sheet of glass having the shape which the safety glass being made is to possess. This three element assembly is then subjected to the usual treatment for the fabrication of laminated glass by action of heat and pressure in an autoclave, and the guard sheet is thereafter separated from the finished laminate, which comprises a single or composite sheet of glass and a plastic sheet adhered to an exterior face of that single or composite glass sheet. While the laminate may be planar, i.e. flat, it may be non-planar, with simple or compound curvature, as in the case of windshields, rear windows or the side glass of motor cars. Prior art processes of this character are described in the published German applications for U.S. Pat. Nos. 2,055,361 and 2,161,217, and in Belgian Pat. No. 788,868.

Still other methods of laminating are known which dispense with the guard sheet in the bonding of the plastic sheet to the remainder of the laminate and which produces laminated safety glass of high optical quality such as is necessary for the windshields of motor vehicles.

One such method involves pressing the sheet of plastic, optionally coated with an adhesive, against the glass sheet with the help of a membrane made of a highly stretchable or extensible material, such as rubber, firmly held at its periphery and subjecting it to the action of a fluid under pressure. The periphery of the membrane is held at a fixed distance from the edge of the glass thereby causing the membrane to bulge or stretch progressively into three-dimensional curvature with the gradual application of fluid pressure, pressing against the plastic sheet, which in turn presses against the glass, first in the central region and then progressively out to the edges of the glass. By this means, laminated safety glass with an exterior plastic sheet can be produced of high optical quality. An advantage of such process resides in the fact that the plastic sheet is pressed first against the center of the glass sheet and then progressively over the entire surface thereof in a regular fashion. The surface of the plastic sheet is thus applied progressively against the glass. The result is a smooth and substantially perfect lamination of the glass and plastic sheets together.

It is desirable to de-gas the assembly under vacuum before laminating the glass and plastic sheets together, in order to eliminate gas or air bubbles between the separate layers. During the de-gassing operation, if the face of the membrane away from the laminate being formed is subjected to atmospheric pressure, the vacuum employed for de-gassing will bulge the membrane against the plastic sheet so that an initial portion of the pressing or laminating step will be carried out. It may, however, be preferable to carry out the de-gassing without applying to the plastic and glass sheets any pressure tending to laminate the two together. To this end, the vacuum or partial vacuum for de-gassing may be provided on both sides of the membrane. When the desired degree of vacuum has been obtained between the glass and plastic sheets to be laminated together, the process of laminating or pressing can begin. It may be begun by re-establishing atmospheric or supra-atmospheric pressure on the side of the membrane away from the plastic sheet.

In one mode of carrying out such laminating, there are employed for the plastic sheet (and for the adhesive, if a separate one is used to affix the plastic sheet to the substrate), materials which can be activated by heat. The pressing thereof against the glass sheet is then carried out at elevated temperature. For example, it is possible to preheat the glass sheet to the temperature necessary to obtain activation of the plastic and adhesion thereof to the glass, pressing of the plastic sheet to the preheated glass being then carried out in an enclosure which is either at ambient temperature or at a temperature which need be only slightly higher than ambient.

Where the method is used to laminate a soft elastic outer ply to a laminated safety window, it can advantageously be used to simultaneously affix a hard scratch-resistant plastic material over so much of the window areas as is intended for labels or stickers that may be required. The hard plastic label support can be secured to the soft plastic layer by using a heat-activated adhesive which is activated during the autoclaving step employed to laminate the soft plastic layer to the window substrate.

A preferred soft plastic outer layer is formed by curing a sheet of a liquid composition containing (1) a polyglycol ether resulting from the condensation of 1,2-propylene oxide with 2,2-bis(hydroxymethyl)-1-butanol and having 10.5 to 12% free hydroxyls and (2) a biuret of 1,6-hexane diisocyanate having 21 to 22% isocyanate groups, the weight ratio of said biuret to said polyglycol ether being about 0.9 to 1.1. Such soft plastic sheet will generally possess a high capacity of elastic deformation, a modulus of elasticity below 2,000 daN/cm$^2$ and an elongation to rupture in excess of 60% with less than 2% plastic deformation. The preferred thermoset polyurethane film or plastic sheet, in case of collision and breakage of the windshield, operates to prevent contact of the passengers with the sharp edges of the glass.

The label supports of this invention are suitably employed with safety glass windshields for automotive vehicles having high resistance to impact comprising at least one sheet of glass, which may be tempered, and having, on the side thereof to be indoors or toward the interior of the vehicle in which the window is to be mounted, a sheet of soft plastic material, preferably the polyurethane material described above, adhesively bonded to the innermost of the glass sheets.

Safety windows comprising at least one glass sheet having bonded thereto a scratch-resistant layer of the above polyurethane and safety glass laminates of a plurality of solid glass sheets having disposed between adjacent sheets an adherent, transparent interlayer of polyvinylbutyral and having bonded to at least one outer glass sheet of this laminate an adherent solid transparent layer of the above-described scratch-resistant polyurethane are especially subject to marring by affixing and removing labels and, therefore, in need of the label supports of this invention.

In another of the preferred safety window embodiments in which the present invention is used, the self-healing layer of window laminate comprises: (A) a film of polyurethane of three-dimensional network, that is, a crosslinked or thermoset polyurethane, having self-healing and anti-lacerative properties, and joined thereto (B) a film of polyurethane of linear chains, that is, a thermoplastic polyurethane, having the ability to adhere to glass or plastic, for example, polycarbonate. The films of thermoplastic and thermoset polyurethane can be joined by physical surface adhesion or the joining of the films can include chemical bonding. The surface of the thermoplastic film, as well as that of the thermoset film, is substantially non-tacky at room temperature (for example, about 15° C. to about 35° C.) that is, at temperatures likely to be encountered in a facility in which the sheet is manufactured, stored, and/or used in preparing a glazing laminate. At temperatures in excess of about 35° C., the thermoplastic material is softened to the extent that when the sheet is pressed to a glass or plastic substrate, the thermoplastic material is capable of flowing and adhering to the substrate to an extent that the sheet does not slip or slide on the surface of the substrate.

By way of illustration, the safety glass laminate with a self-healing layer applied as a preformed sheet can be made by pressing a preformed polyurethane sheet having a non-tacky thermoplastic surface at room temperature onto a substrate or laminate ply which has been heated to a moderately elevated temperature (for example, about 50° C. to about 80° C.), at which the thermoplastic material softens, flows and adheres to the extent that the sheet does not slip or slide from the surface of the substrate or ply, even when handled at room temperature. Exemplary pressures that can be used are about 0.5 to about 2 bars above atmospheric pressure. Bonds so formed from suitable thermoplastic materials are sufficiently firm to permit satisfactory handling of the laminate and they can be made still firmer and stronger by subjecting the laminate to higher temperatures and pressures. This can be effected in an autoclave, for example, at temperatures and pressures within the ranges respectively of about 100° C. to about 140° C. and about 3 to about 15 bars above atmospheric pressure, depending on the nature of the materials comprising the plies of the laminate.

The pre-formed sheet of self-healing polyurethane can be formed in various ways. A mixture of the liquid monomers from which the thermoset material is formed can be cast onto a solid film of the thermoplastic adhesive material and polymerized to form a solid thermoset layer adhered to the underlying thermoplastic film. The sheet of thermoplastic adhesive material can be formed in any suitable way, for example, by a casting or extrusion operation.

The following method has been used advantageously in forming a pre-formed sheet of self-healing polyurethane. A monomeric mixture of the reactants which form the desired thermoset polyurethane are cast onto a moving glass support, coated with a release agent, by a casting head having a narrow elongated slot.

After the monomers have polymerized (accelerated by heat) to form a solid thermoset polyurethane film, a solution comprising the thermoplastic polyurethane dissolved in a suitable solvent is cast in a similar manner onto the previously formed film of thermoset polyurethane. As the solvent is evaporated, aided by heat, there is formed a solid film of the thermoplastic polyurethane firmly bonded to the underlying thermoset film.

A modified form of this method includes casting a solvent-free monomeric mixture of the reactants which form the thermoplastic film onto the film of thermoset polyurethane. This method is advantageous in that a solvent removal step is avoided. An illustrative sheet of a preferred thermoset polyurethane having anti-lacerative and self-healing properties is described in U.S. Pat. No. 3,979,548.

A thermoset polyurethane of the aforementioned type was prepared from the following monomers which first de-gassed by stirring under reduced pressure to avoid the formation of bubbles in the film formed from the polyurethane:

(A) 1000 g of a polyether having a molecular weight of about 450 and obtained by the condensation of 1,2-propylene oxide with 2,2-bis(hydroxymethyl) 1-butanol and having a percentage of free OH groups of about 10.5 to about 12% (for example, the product sold under the trademark DESMOPHEN 550 U of the Bayer AG), and (B) 1000 g of a biuret of 1,6-hexanediisocyanate containing about 21 to 22% of free NCO groups (for example, the product sold under trademark DESMODUR N/100 of the Bayer AG).

Prior to mixing the monomers, monomer (A) was first mixed with 23 g of an antioxidant, namely, 2,6-di(tert-.butyl) 4-methylphenol (for example, the product sold under the trademark IONOL by Shell) and 0.5 g of a catalyst, namely, dibutyltin dilaurate.

The homogeneous mixture obtained by mixing the aforementioned was cast onto a glass plate coated with a release agent. The monomers polymerized under the influence of heat and formed a solid thermoset polyurethane film having anti-lacerative and self-healing properties.

A thermoplastic polyurethane was formed from the following monomers which were first de-gassed by stirring under reduced pressure to avoid the formation of air bubbles in the film formed from the polyurethane:

(A) 980 g of a linear polyether having a mean molecular weight of about 2000 and prepared from 1,2-propane diol and 1,2-propylene oxide and having about 1.6 to 1.8% of free hydroxyl groups (for example, the product sold under the trademark DESMOPHEN 3600 by Bayer) and (B) 110 g of 3-isocyanatomethyl-3,5,5-trimethylcyclohexylisocyanate having a content of free NCO groups of about 37.5% and sold under the trademark IPDI by Veba AG.

Prior to mixing the monomers, monomer (A) was first mixed with 4 g of an antioxidant, namely 2,6-di(tert.butyl) 4-methylphenol (IONOL) and 0.1 g of dibutyltin dilaurate catalyst.

The monomeric mixture was cast onto the previously formed film of thermoset polyurethane and polymerized thereon to form a film which is solid at room temperature and which adheres tightly to the underlying film of thermoset polyurethane thereby forming a sheet of the present invention. The solid flexible plastic sheet formed from the two joined films of thermoplastic and thermoset polyurethane was stripped from the underlying glass support and its non-tacky thermoplastic surface was applied to a glass substrate and adhered thereto. This was done by pressing the sheet onto the glass substrate with a rolling pin at room temperature and thereafter placing the laminate in an autoclave for about 1 hour at a temperature of about 135° C. and a pressure of 6 bars above atmospheric pressure. The sheet was firmly and uniformly bonded to the glass and it had excellent transparency properties.

As to exemplary thickness of the films comprising the self-healing layer, the thermoset material can have a thickness of about 0.2 to about 0.8 mm, and preferably from about 0.4 mm to about 0.6 mm, and the thermoplastic film can have a thickness of about 0.01 to about 0.8 mm, and preferably about 0.02 to about 0.6 mm. Accordingly, the thickness of the sheet can be, for example, about 0.21 mm to about 1.6 mm. Sheets having film thicknesses within the aforementioned ranges have been used to excellent advantage in preparing windshields of the type in which an energy-absorbing sheet such as poly(vinyl butyral) is sandwiched between two glass plies.

The following are exemplary monomers that can be used to prepare the thermoset polyurethane: aliphatic bifunctional isocyanates such as 1,6-hexanediisocyanate, 2,2,4- and 2,4,4-trimethyl-1,6-hexanediisocyanate, 1,3-bis(isocyanatomethyl)benzene, bis(4-isocyanatocyclohexyl)methane, bis(3-methyl-4-isocyanatocyclohexyl)methane, 2,2-bis(4-isocyanatocyclohexyl)propane, and 3-isocyanatomethyl-3,5,5-trimethylcyclohexylisocyanate, or their tri-or higher functional biurets, isocyanurates, and prepolymers thereof; and polyfunctional polyols such as branched polyols, for example, polyesters or polyether polyols obtained by the reaction of polyfunctional alcohols such as, for example, 1,2,3-propane triol (glycerol), 2,2-bis (hydroxymethyl)1-butanol (trimethylol propane), 1,2,4-butane triol, 1,2,6-hexane triol, 2,2-bis (hydroxymethyl) 1,3-propane diol (pentaerythritol) 1,2,3,4,5,6-hexane hexol (sorbitol), with aliphatic diacids such as, for example, malonic acid, succinic acid, glutaric acid, adipic acid, suberic acid, sebacic acid or with cyclic ethers, such as, for example, ethylene oxide, 1,2-propylene oxide, and tetrahydrofuran. The molecular weights of the branched polyols desirably fall within the range of about 250 to about 4000, and preferably about 450 to about 2000. Mixtures of different polyisocyanate and polyol monomers can be used. A particularly preferred thermoset polyurethane is described in aforementioned U.S. Pat. No. 3,979,548.

The thermoplastic polymer for use in preparing the self-healing layer is preferably a polyurethane which, instead of being prepared from monomers which form a three-dimensional cross-linked network, react to form linear chains of macromolecules. Exemplary diols that can be used are aliphatic polyesters such as those formed from one or more diacids, such as, for example, malonic acid, succinic acid, glutaric acid, adipic acid, suberic acid and sebacic acid and diols such, for example, 1,2-ethanediol (ethylene glycol), 1,2-propanediol, 1,3-propanediol, 1,2-butanediol, 1,3-butanediol, 1,4-butanediol, 2,2-dimethyl-1,3-propanediol (neopentyl glycol), 1,6-hexanediol, 2-methyl-2,4-pentanediol, 3-methyl-2,4-pentanediol, 2-ethyl-1,3-hexanediol, 2,2,4-trimethyl-1,3-pentanediol, diethylene glycol, triethylene glycol, polyethylene glycols, dipropylene glycol, tripropylene glycol, polypropylene glycols or 2,2,-bis(4-hydroxycyclohexyl) propane and mixtures thereof. In preparing the polyester diol, the addition of lactones, such as gamma-butyrolactone, gamma-valerolactone, delta-valerolactone and epsilon-caprolactone, can be useful. The molecular weight of the polyester is desirably within the range of about 500 to about 4,000 and preferably about 1000 to about 2000.

The thermoplastic polyurethane can also be prepared from linear polyethers having a molecular weight within the aforementioned ranges and prepared from the following exemplary comounds: ethylene oxide, 1,2-propylene oxide and tetrahydrofuran.

Examples of difunctional aliphatic isocyanates which can be reacted with the aforementioned diols (the polyesters and/or polyethers) to produce the thermoplastic polyurethane are: 1,6-hexanediisocyanate, 2,2,4- and 2,4,4-trimethyl-1,6-hexanediisocyanate, 1,3-bis-(isocyanatomethyl) benzene, bis(4-isocyanatocyclohexyl)methane, bis(3-methyl-4-isocyanatocyclohexyl)methane, 2,2-bis(4-isocyanatocyclohexyl)propane, and 3-isocyanatomethyl-3,5,5-trimethylcyclohexylisocyanate.

Any of the aforementioned methods can be utilized to form pre-formed sheets of continuous length.

Safety windows incorporating a pre-formed sheet of polyurethane in a laminated self-healing anti-lacerative windshield are made with a pre-formed plastic sheet adhered to one glass sheet of the windshield which, in turn, is adhered to a second glass sheet by a plastic interlayer, for example, poly(vinyl butyral), which functions also as an energy absorber by conventional laminating techniques such as described above. Both the plastic sheet and the label support can be adhered to the laminated windshield in the same laminating step, and if desired, used to join the glass sheets and inter layer. Alternatively, the plastic sheet and the label support can be adhered to the glass in separate process steps.

In its process aspect, the present invention comprises affixing a label support to the coated surface of a window wherein the coating is a self-healing anti-lacerative plastic material, particularly, any of polyurethane film or sheet materials of the type described herein.

In accordance with the present invention, it has been found that in order to obtain sufficient adhesion between the label support and the soft plastic protective coating, it is necessary to fix the adhesive with heat and pressure, preferably by subjecting it to the same autoclaving cycle as is generally employed in affixing the soft plastic protective coating to the underlying glass or rigid transparent plastic substrate. In order to assure adequate adhesion of the label support so as to prevent its peeling away from the soft plastic protective layer during repeated removal of labels, it has been found necessary to employ an adhesive that is compatible with both the label support material and the soft plastic protective coating and to cure the adhesive with heat and pressure. Thus, a window having a self-healing anti-lacerative polyurethane coating can be provided with a hard plastic label support in accordance with this invention by cutting from hard plastic sheet material a label support of appropriate width, breadth and thickness, as described above. The label support is then coated on one surface with a suitable adhesive which is then partially dried to evaporate the solvent. The label support is then put in position on the window with an initial treatment at slightly elevated temperature, i.e. up to about 50° C., with pressing or calendering followed by treatment in an autoclave cycle, preferably at temperatures between about 100° to 140° C. and a pressure of about 3 to 15 bars above atmospheric pressure for a period of time between about 10 minutes and several hours, generally about one to two hours. Specifically, the autoclaving is done at about 135° C. and 6 bars pressure for about one hour. The calendering and autoclaving steps can be performed simultaneously and using the same conditions as are generally employed in fixing the soft plastic protective layer to the substrate of glass or rigid transparent material. In this way, it has been found that a label support capable of withstanding peeling forces greater than the force necessary to rupture the underlying soft polyurethane film can be achieved. The peeling strength is further improved by an accelerated aging of the composite laminate through alternate periods of high temperature and humidity followed by low humidity, ultraviolet, and lowe temperature treatments. The aging further improves the adhesive strength between the label support and the underlying soft plastic film. Similar aging conditions do not generally affect the adhesive strength of labels with preapplied adhesives. Such labels can be readily applied and removed from label supports affixed to windows in the above-described manner without destroying the label support for repeated use with new labels.

Laminates in which the preferred polyurethane and label support are adhered to a plastic ply can be prepared also.

Examples of plastics which can be used as label support materials are polycarbonates, polyacrylics, poly (vinyl chloride), polystyrene and cellulose esters, for example, the acetic, propionic and butyric esters.

The process of the invention may be carried out by employing a sheet of self-healing plastic previously coated with a layer of adhesive on the face thereof which is to contact the glass or similar substrate, and likewise, the hard plastic label support can be coated with a layer of adhesive on the face thereof which is to be adhered to the soft plastic layer. It is also possible, however, to employ a separate film or coating of adhesive interposed between the separate sheets to be laminated, e.g. between the glass and the soft plastic sheets and between the hard plastic label support and the soft plastic sheet. It is also possible to use for the plastic sheet a material which is self-adhesive to the glass when in the plastic state, without the employment of any further adhesives, and it is also possible to use the process for laminated windows of several plastic layers.

TESTS

Tests carried out with self-adhesive plastic sheet material as a label support were unacceptable as far as finding a solution for the problem of protecting the self-healing plastic coating is concerned, because the commercially available self-adhesive plastic materials are too thin (30 to 60 microns) and because the materials used are mostly acetate film which does not stand up to the mechanical demands. Tests with acrylate-adhesive coated polyester film of about 50 microns thickness (available under the brand name Scotch Tint from the 3M Company) showed that the mechanical resistance of the film as well as the adhesion of the protective support and the soft coating of the laminate, were not satisfactory and no suitable label support material was found that could be glued to the soft plastic face of the window laminate at room temperature.

In accordance with this invention, it was found that best results are obtained with a thermo-plastic adhesive which creates a strong bond between the various hard plastic films suitable for use as a label support and the soft plastic ply of safety windows of the preferred type described herein. The bond obtained by such thermo-plastic adhesive is stable to light and weather-proof, and is free of streaks, blisters and other flaws.

In a preferred method of affixing the hard plastic label support to the self-healing plastic face of a laminated safety window, a 30 to 90 micron thick wet layer of a suitable adhesive as described herein is wiped onto the hard plastic label support of polyester, polycarbonate, or hard-PVC cut to the appropriate size. After a drying time which may vary depending on the solvent content of the adhesive, the film is warmed to approximately 40° C. and rolled onto the soft plastic layer of the safety window laminate while avoiding the creation of air bubbles. A protective label support film thus applied to the desired area of the safety window is subsequently exposed to a two-hour long autoclave process at 137° C. and 11 bars, which preferably is done simultaneously with the lamination of the safety window as described above. The results obtained with various protective label support films and adhesives can be seen from the following table:

| Protective Film | Mechanical Resistance of Protective Layer | Adhesive | Adhesion | Optical Properties | | | Defects | | | | |
|---|---|---|---|---|---|---|---|---|---|---|---|
| | | | | Good | Moderate | Poor | Bubbles | Scratches | Crows Feet | Yellowing | Cloudy |
| Polyvinylchloride (PVC) About 100 microns thick | Moderate | Scotch Clad EC-776 - Available from the 3M Company Neun/Rhein, West Germany | Good | x | | | | | | x | |
| | | Scotch Grip EC-4475 - Available from the 3M Company | Moderate | | x | | | x | | | |
| Polycarbonate (PC) About 100 microns thick | Moderate | Scotch Grip Available from the 3M Company | Moderate | | x | | | | x | | x |
| | | Scotch Clad Available from the 3M Company | Good | x | | | | | | x | |
| Polyester About 100 microns "Mylar" - Available from Du Pont deNemours GmbH Dusseldorf, W.Ger. | Good | Scotch Grip - the 3M Company | Good | | x | | | x | | | x |
| "Terphane" Available from La Cellophane, Paris FRANCE | Good | Ko-F 140 - Available from Kommerling Chem. Fabrik KG, Permaien, W. Germany | Good | x | | | | | | | |
| | | IFDI-U 621- Available from Veba-Chemie Wanne-Eickel, W. Germany | Good | x | | | | | | | |
| "Kostaphan" ENH - Available from Kalle AG, Wasboden-Biebrich, West Ger. | Good | Ko-F 140 +5= inc. TP-95 reinforcing agent - available from Kommerling Ch. Fabrik KG. | Very good | x | | | | | | | |
| | | IDPT-U 625 Available from Veba-Chemie | Very good | x | | | | | | | |

| Protective Film | Mechanical Resistance of Protective Layer | Adhesive | Adhesion | Optical Properties | | | Defects | | | | |
|---|---|---|---|---|---|---|---|---|---|---|---|
| | | | | Good | Moderate | Poor | Bubbles | Scratches | Crows Feet | Yellowing | Cloudy |
| | | Wanne-Eichel, West Germany | | | | | | | | | |

The results show that an effective label support surface can be obtained with a label support of polyester, polycarbonate or PVC, affixed with an adhesive such as nitrile rubber adhesive, for example, an adhesive sold under the brand name Scotch-Clad EC 776 by the 3M Company.

The preferred label support for this invention is a polyethylene terephthalate or polyvinylchloride of about 100 microns though thinner or heavier films, e.g. about 75 to 125 microns can be used. The preferred adhesive is a thermohardening polyester/polyurethane though other adhesives can be used, the aliphatic polyester polyurethanes are especially preferred. The fact that use of an adhesive such as Scotch-Clad causes a yellow coloration it can be used to mark the label support area. Especially since this yellow tone can be changed to a more pleasant green color if blue coloring re-agents are added to the adhesive.

On the other hand, adhesives which remain colorless after the autoclave process can be colored by adding appropriate coloring agents.

The hardest and most resistant protective label supports are formed from polyester film bonded to the polyurethane layer by a strong and optically acceptable bond with such adhesives as Ko-F140 and IPDI-U 628, available from Veba-Chemie. If desired, a reinforcing agent such as TP 75 sold by Kommerling Chem. Fabrik KG can be added to the adhesive to prevent the possible decomposition of the adhesive at the higher temperature (137° C.) and thereby prevent the formation of "crows feet" in the adhesive bond. Where a polyester film is employed as the label support, there can be used commercially available films which are precoated with adhesive. Where the adhesive is applied at the time of assembling with the safety window, the drying time can be reduced by concentrating the adhesive before applying the label support.

The following is by way of specific exemplification of a preferred embodiment of the application of protective layers for label support on soft plastic coating layers.

A wet layer of 90 microns of Ko-F140 adhesive (with 5% TP 75) is wiped onto a polyester film of approximately 100 microns (for instance, Hostaphan BNH) which has been treated by the manufacturer, with a coupling agent. After a drying time of approximately 5 minutes at 40° C. and a corresponding warming of the film, it is rolled onto the soft plastic polyurethane outer layer of a safety window of the type described above, and is subjected to the subsequent lamination process of the safety window.

Referring again to the drawings, Support 2 has a thickness from about 20 to 200 microns and preferably from about 50 to 150 microns and consists of a plastic with a sufficient hardness to resist scratching. Such materials include polyesters, polyamides, polyurethanes, polyvinylchloride polyacrylates, polycarbonates, cellulose esters, and copolymers of styrene and acrylonitrile.

Adhesive layer 7 has a thickness from about 5 to 100 microns and preferably from about 10 to 50 microns.

The adhesive itself may consist of thermoplastics of the materials disclosed above. Curing resins such as epoxy resins, cyanoacrylates or polyurethane prepolymers as well as self-adhering pressure-sensitive substances such as polyvinyl acetate, polyethylacrylates, polybutylacrylates, poly (ethyl-hexyl) acrylates, butadiene styrene polymers, polyisobutenes, polychloroprenes, nitrile rubbers, rubber nitrile phenol resins, and natural rubber may also be used.

In a preferred embodiment, Support 2 consists of a 100 micron layer of polyethylene terephthalate such as HOSTAPHAN BNH marketed by the Kalle Company (Wiesbaden) of approximately label dimensions. It is secured to the protective layer 6 of self-healing polyurethane with an adhesive such as IPDI-U-628 marketed by Veba-Chemie (Wanne-Eickel). Good results are also obtained by using 100 micron films of a hard polyvinyl chloride such as GENOTHERM V. G. marketed by the Kalle Company as Support 2 which is secured to protective layer 6 with a nitrile rubber such as SCOTCH-CLAD-ED-775 marketed by the 3M Company (Neuss).

The following additional embodiments demonstrate the superior adhesion obtained by the use of heat and pressure to secure the label support to the polyurethane-coated substrate:

A polyurethane-coated 3-ply glass safety window available as Securiflex from Saint-Gobain Industries, Neuillysur-Seine, France, is used as the window substrate to which the following label supports are applied:

No. 1 label support film of transparent terephthalatepolyethylene, 100 microns thick, sold under the brand name Hostaphan BNH by Kalle, Wiesbaden, Germany, covered with a layer, 50 microns thick, of polyurethane glue, sold as IPDI-U by Veba, Wanne-Eickel, Germany.

No. 2 label support film of transparent polyvinyl chloride, 100 microns thick, sold as Genotherm V.G. by Kalle, Wiesbaden, Germany, covered with a layer of rubber nitrile glue, 50 microns thick, sold as Scotch-Clad ED-776 by 3M Company, Neuss, Germany.

The width of label support films is both cases is 5 cm.

The label employed in the tests is a label of self-adhesive ribbon, 4 cm wide, sold as Tesafix 964 by Beiserdorf, Hamburg, Germany.

The equipment employed in these tests includes the following:
Oven with circulating air.
Small apparatus with two calanders for laminating
Air pressured autoclave at 115° C. and 11 bars.
Climate chamber at 50° C. and 100% relative humidity.
Light chamber with U.V. radiation at about 50° C. (4×OSRAM VITALUX at 300 Watts at 30 cm distance)
Refrigerating room at −18° C.

TESTS

A. In order to show the application of the label support on a SECURIFLEX window by using heat and pressure, the two representative label supports identified above were applied with heat at 100° C. and with pressure at about 2 bars. In both cases, the adhesion obtained was nearly non-existent that is to say, when a label glued onto the label support was pulled off, the force required was sufficient to completely pull the label support off as well.

Securiflex windows with label supports in place as above, were heated at 100° C. for 20 minutes. After removal from the heating, the label support barely adhered to the Securiflex. Result: A trivial adhesion.

Securiflex samples with label supports as above, were treated with pressure by calandering. The resulting adhesion was even weaker that that obtained by heating as above.

B. Good adhesion was, however, obtained by first calandering at 50° C. followed by an autoclave cycle at the conditions used in laminating the Securiflex type window (115° C., 11 bars). The table attached gives the results. A portion of each sample was subjected to an accelerated aging as follows: 120 hours at 50° C. and 100% relative humidity followed by 72 hours at 60° dry, followed by 24 hours at the U.V. (of the glass side), followed by 50 hours at $-18°$ C.

After aging, the adhesion was so elevated that an exact measurement was not possible. The label support and the polyurethane protective film broke before coming unglued. Only the label was detached easily.

The results of both label support examples are given below. The peeling test is carried out by loosening an edge of the test layer and pulling perpendicular to the plane of the laminate at a rate of 5 cm per minute. The average force necessary to peel the layer from the substrate is measured. As shown in the table below, the column designated "A" represents the peeling force necessary to remove the label; "B" is the force required to peel the label support; and "C" is the peeling force that the protective polyurethane film is capable of withstanding.

| | PEELING STRENGTH OF ADHESIVE BOND IN daN/5cm | | | |
|---|---|---|---|---|
| | | A | B | C |
| LABEL SUPPORT NO. 1 | AFTER AUTOCLAVE TREATMENT | 1.5 | 4.5 | 10 |
| | AFTER ACCELERATED AGING | 1.6 | >14* | >14* |
| LABEL SUPPORT NO. 2 | AFTER AUTOCLAVE TREATMENT | 1.4 | 10 | 12 |
| | AFTER ACCELERATED AGING | 1.6 | >15* | >16* |

*maximum force measured before rupture of the film.

The improved safety glass disclosed in this invention is not limited to use in vehicles but can also be employed for glass doors or partitions.

I claim:

1. In a safety windshield comprising a safety glass laminate of a plurality of solid glass sheets and an adherent transparent inner layer of polyvinylbutyral and having bonded to at least one outer glass sheet of said laminate, an adherent solid transparent layer of polyurethane, the improvement which comprises adhesively attaching to said self-healing polyurethane layer, a hard scratch-resistant plastic layer having surface dimensions of about 0.1 to about 1% of the total surface area of the self-healing layer and curing the adhesive at a temperature above about 100° C. and a pressure above about 3 bars greater than atmospheric pressure.

2. The safety windshield of claim 1 wherein the self-healing polyurethane comprises (A) a film of polyurethane of three-dimensional network having self-healing and anti-lacerative properties and joined to (B) a film of polyurethane of linear chains having the ability to adhere to glass or plastic.

3. The safety windshield according to claim 2 wherein the polyurethane layer is a pre-formed sheet prepared by casting a monomeric mixture of (A) a polyether having a molecular weight of about 450 and obtained by the condensation of 1,2-propylene oxide with 2,2-bis(hydroxymethyl)1-butanol and having about 10.5 to about 12% free OH groups and (B) a biuret of 1,6-hexanediisocyanate containing about 21 to about 22% of free NCO groups, onto a glass plate and polymerizing the mixture under the influence of heat to form a solid thermoset polyurethane film and thereafter casting onto the previously formed thermoset polyurethane film a monomeric mixture comprising (A) a linear polyether having a mean molecular weight of about 2,000 and prepared from 1,2 propanediol and 1,2 propylene oxide and having about 1.6 to about 1.8% free OH groups and (B) 3-isocyanatomethyl-3,5,5-trimethylcyclohexylisocyanade having about 37.5% free NCO groups, to form a thermoplastic polyurethane film which adheres tightly to the underlying film of thermoset polyurethane.

4. In a safety windshield comprising at least one glass sheet having bonded thereto a scratch-resistant layer of self-healing polyurethane formed by curing a sheet of a liquid composition containing (1) a polyglycol ether resulting from the condensation of propylene oxide with trimethylolpropane and having about 10.5 to 12% free hydroxyls and (2) a biuret of 1,6-hexamethylene diisocyanate having about 21 to 22% isocyanate groups, the weight ratio of said biuret to said polyglycol ether being about 0.9 to 1.1; the improvement which comprises a label support of hard scratch-resistant plastic material, of generally rectangular dimensions such that the surface area of the label support is about 0.1 to about 1% of the total area of one side of the windshield, adhesively affixed to the polyurethane layer with a layer of thermohardening adhesive.

5. A safety windshield according to claim 4 wherein the label support is made of polycarbonate, polyester or hard polyvinyl chloride.

6. A safety windshield according to claim 4 wherein the adhesive is a thermosetting aliphatic polyester polyurethane.

7. A safety windshield comprising at least one glass sheet having bonded thereto a soft plastic outer layer of self-healing polyurethane formed by curing a sheet of a liquid composition containing (1) a polyglycol ether resulting from the condensation of propylene oxide with trimethylolpropane and having about 10.5 to 12% free hydroxyls and (2) a biuret of 1,6-hexamethylene diisocyanate having about 21 to 22% isocyanate groups, the weight ratio of said biuret to said polyglycol ether being about 0.9 to 1.1; and a label support of hard scratch-resistant plastic material bonded to the outer side of the soft plastic layer of self-healing polyurethane with a layer of adhesive material capable of withstanding peeling forces greater than the force necessary to rupture the underlying soft polyurethane such that the soft plastic is not disturbed when a label attached to the label support is removed, and said label support covering an area of about 0.1 to about 1% of the total surface area of the outer side of the self-healing polyurethane layer.

8. A safety windshield according to claim 7 wherein the label support is adhesively affixed to the polyurethane layer with a layer of thermohardening adhesive.

9. A laminated window comprising a substrate of at least one glass or plastic sheet having bonded thereto a soft plastic outer layer of self-healing polyurethane having a modulus of elasticity below 2,000 daN/cm$^2$ and an elongation to rupture in excess of 60% with less than 2% plastic deformation and formed by curing a sheet of a liquid composition containing (1) a polyglycol ether resulting from the condensation of propylene oxide with trimethylolpropane and having about 10.5 to 12% free hydroxyls and (2) a biuret of 1,6-hexamethylene diisocyanate having about 21 to 22% isocyanate groups, the weight ratio of said biuret to said polyglycol ether being about 0.9 to 1.1; and a label support of hard scratch-resistant material bonded to the outer side of the soft plastic outer layer of self-healing polyurethane with a layer of adhesive material which is cured with heat and pressure, said label support covering an area of about 0.1 to 1% of the total surface area of the self-healing polyurethane layer.

10. A laminated window comprising a substrate of at least one glass or plastic sheet having bonded thereto a soft plastic outer layer of self-healing polyurethane having a modulus of elasticity below 2,000 daN/cm$^2$ and an elongation to rupture in excess of 60% with less than 2% plastic deformation; and having a label support of hard scratch-resistant material bonded to the outer side of the soft plastic outer layer of self-healing polyurethane with a layer of thermohardening adhesive material which is cured with heat and pressure, said label support covering an area of about 0.1 to 1% of the total outer surface area of the self-healing polyurethane layer.

11. A method for making laminated safety glass windshields having at least one outer surface thereof coated with a self-healing anti-lacerative sheet of polyurethane with at least one delineated area suitable for removably affixing labels thereto without damaging said polyurethane layer which comprises superimposing a sheet of glass or glass composite and a sheet of the self-healing polyurethane to be joined to the glass, and a sheet of hard plastic, of rectangular dimensions and a surface area of about 0.1 to 1.0% of the total surface area of the polyurethane layer, with an adhesive coating or layer between the hard plastic label support and the polyurethane sheet, said label support located in a delineated area of the polyurethane sheet which is convenient for label attachment; and subjecting the entire assembly to the action of heat and pressure in an autoclave in order to produce a finished laminate having an outer surface of self-healing polyurethane with a hard plastic label support affixed to said polyurethane surface.

12. A method according to claim 11 wherein the autoclave step is carried out at a temperature between about 100° C. and about 140° C. and a pressure between about 3 bars and about 15 bars above atmospheric pressure.

13. A method according to claim 12 wherein the laminate with label support attached is heated to a temperature between about 50° C. and about 100° C. and calandered prior to treatment in an autoclave.

14. A method according to claim 13 wherein the autoclaving is carried out at about 135° C. and about 6 bars above atmospheric pressure for about one hour.

15. A laminated safety glass windshield having a hard plastic label support affixed thereto made in accordance with the method of any one of claims 11 to 14.

* * * * *